(12) United States Patent
Ingram et al.

(10) Patent No.: US 8,201,787 B2
(45) Date of Patent: Jun. 19, 2012

(54) CLAMP, SELF-ADVANCING CLIMBING DEVICE, AND METHOD OF COUPLING SAME TO A TUBULAR

(75) Inventors: James Ingram, Aberdeen (GB); Stewart Kenyon Willis, Glasgow (GB)

(73) Assignee: ITI Scotland Limited, Glasgow (GB)

( * ) Notice: Subject to any disclaimer, the term of this patent is extended or adjusted under 35 U.S.C. 154(b) by 968 days.

(21) Appl. No.: 11/814,336

(22) PCT Filed: Jan. 19, 2005

(86) PCT No.: PCT/GB2005/000181
§ 371 (c)(1),
(2), (4) Date: May 5, 2008

(87) PCT Pub. No.: WO2006/077358
PCT Pub. Date: Jul. 27, 2006

(65) Prior Publication Data
US 2008/0203246 A1 Aug. 28, 2008

(51) Int. Cl.
*F16L 3/08* (2006.01)
*F16L 3/12* (2006.01)
*A47B 96/06* (2006.01)
*A47G 29/00* (2006.01)
*A47K 1/00* (2006.01)
*A63B 27/00* (2006.01)
*E04G 3/00* (2006.01)

(52) U.S. Cl. .................. 248/218.4; 248/74.1; 248/219.3; 248/219.4; 248/227.3; 248/230.1; 403/373; 108/152; 182/136; 182/187; 182/188

(58) Field of Classification Search ............... 248/218.4, 248/74.1, 219.3, 219.4, 227.3, 230.1; 403/373; 108/152; 182/136, 187, 188
See application file for complete search history.

(56) References Cited

U.S. PATENT DOCUMENTS
RE20,653 E * 2/1938 Lamb ............................ 182/113
(Continued)

FOREIGN PATENT DOCUMENTS
DE 19647515 A1 5/1998
(Continued)

OTHER PUBLICATIONS
Translation of Chinese Office Action, dated Aug. 2, 2011, in connection with Chinese Application No. 200910157631.3 (18 pages).
(Continued)

*Primary Examiner* — Terrell McKinnon
*Assistant Examiner* — Christopher Garft
(74) *Attorney, Agent, or Firm* — K&L Gates LLP (57) ABSTRACT

There is disclosed a clamp, a self-advancing climbing device including two such clamps, and a method of coupling such a clamp to a tubular. In one embodiment of the invention, there is disclosed a clamp (1) for a tubular, in particular a thin-walled tubular such as the tower (3) of a wind-turbine. The clamp (1) comprises at least one clamp member in the form of a friction pad (9) adapted to grip the tower (3), and at least one flexible elongate energising element in the form of a tendon (16) adapted to exert a force on the friction pad (9) to urge the pad (9) to grip the tower (3), whereby the pad (9) and the tendon (16) are adapted to exert a substantially uniform radial clamp load on the tower (3).

17 Claims, 4 Drawing Sheets

U.S. PATENT DOCUMENTS

| Patent No. | | Date | Inventor | Class |
|---|---|---|---|---|
| 3,187,838 | A * | 6/1965 | Stewart, Jr. et al. | 182/144 |
| 3,575,005 | A | 4/1971 | Sumner | |
| 3,586,127 | A * | 6/1971 | Jones | 182/133 |
| 4,002,038 | A | 1/1977 | Phares et al. | |
| 4,473,256 | A | 9/1984 | Collins | |
| 4,757,592 | A | 7/1988 | Reed | |
| 4,828,125 | A | 5/1989 | Svedaker | |
| 5,028,194 | A | 7/1991 | Robinson | |
| 5,447,391 | A | 9/1995 | Gallaher et al. | |
| 5,467,955 | A * | 11/1995 | Beyersmith | 248/219.3 |
| 5,497,857 | A | 3/1996 | Warren et al. | |
| 6,273,902 | B1 | 8/2001 | Fogarty et al. | |
| 6,522,025 | B2 | 2/2003 | Willis et al. | |
| 6,551,027 | B2 | 4/2003 | Willis et al. | |
| 6,563,475 | B2 * | 5/2003 | Ianello et al. | 343/890 |
| 6,592,331 | B1 | 7/2003 | Wobben | |
| 6,634,202 | B1 | 10/2003 | Oetiker | |
| 6,710,751 | B2 * | 3/2004 | Ianello et al. | 343/890 |
| 6,725,972 | B1 * | 4/2004 | Krier et al. | 182/187 |
| 6,808,337 | B1 | 10/2004 | Thomsen | |
| 7,163,355 | B2 | 1/2007 | Ingle et al. | |
| 2002/0009333 | A1 | 1/2002 | Willis et al. | |
| 2003/0209388 | A1 * | 11/2003 | Arsenault et al. | 182/187 |
| 2004/0011592 | A1 * | 1/2004 | Lee et al. | 182/187 |
| 2004/0074699 | A1 * | 4/2004 | Ehrenfried, Sr. | 182/187 |
| 2005/0260040 | A1 | 11/2005 | Ingle et al. | |
| 2006/0120809 | A1 | 6/2006 | Ingram et al. | |
| 2009/0095569 | A1 * | 4/2009 | Cooper et al. | 182/187 |

FOREIGN PATENT DOCUMENTS

| | | |
|---|---|---|
| DE | 19741988 A1 | 4/1999 |
| EP | 1518053 B1 | 10/2008 |
| FR | 2291389 A1 | 6/1976 |
| GB | 2090894 A | 7/1982 |
| GB | 2169570 A | 7/1986 |
| JP | 2010-047535 | 4/1998 |
| JP | 2011-082285 | 3/1999 |
| JP | 2000-154808 A | 6/2000 |
| JP | 2002-045058 A | 2/2002 |
| JP | 2002-526722 A | 8/2002 |
| JP | 2005-002875 A | 1/2005 |
| RU | 1791202 A1 | 1/1993 |
| WO | 9610130 A1 | 4/1996 |
| WO | 9943956 A1 | 9/1999 |
| WO | 03100248 A1 | 12/2003 |
| WO | 2004022970 A1 | 3/2004 |
| WO | 2005005822 A1 | 1/2005 |

OTHER PUBLICATIONS

Translation of Japanese Office Action, Jan. 2011, in connection with Japanese Application No. 2007-551722 (2 pages).

International Preliminary Report on Patentability for PCT/GB2005/000181; completed on Feb. 19, 2007; mailed on Feb. 19, 2007 (9 pages).

International Written Opinion for PCT/GB2005/000181; completed on Feb. 19, 2007; mailed on Feb. 19, 2007 (8 pages).

Office Action and English Translation for Japanese Application No. 2007-551722, mailed on Feb. 2, 2012, 5 pgs.

* cited by examiner

CLAMP, SELF-ADVANCING CLIMBING DEVICE, AND METHOD OF COUPLING SAME TO A TUBULAR

REFERENCE TO RELATED APPLICATIONS

This application is a national phase application under 35 U.S.C. §371 of International Application No. PCT/GB2005/000181, filed on Jan. 19, 2005.

The present invention relates to a clamp, a self-advancing climbing device comprising two such clamps, and to a method of coupling a clamp to a tubular. In particular, but not exclusively, the present invention relates to a clamp for a thin-walled tubular such as a wind turbine tower and to a method of coupling a clamp to such a thin-walled tubular.

As is well known, pipelines are tubular structures used in various industries for the transportation of fluids. In the oil and gas exploration and production industry, pipelines are often laid on the seabed for the transportation of hydrocarbon containing fluids from offshore to onshore locations. In a pipelaying procedure, it is necessary to support and restrain the pipeline during deployment from a pipelaying vessel onto the seabed. This is achieved using clamps having friction pads which are restrained against axial movement relative to the pipeline, and which are coupled to the pipeline by application of a direct pressure over the area of the pad.

Clamps of this type aim to apply a clamping load over as great a portion of the circumference of the pipeline as possible, in order to avoid ovalisation or collapse due to instability. US patent publication no. 2002/0009333 (Willis and Turnbull) discloses one such clamp, the clamp including a number of radially oriented pistons, each piston carrying a corresponding rigid shoe having an arcuate surface of fixed radius which is urged into abutment with the pipeline, and a friction tile mounted on the surface of the shoe, to enhance grip with the pipeline. When actuated, the piston shoes substantially encircle the pipeline.

Whilst clamps of this type are effective in restraining pipelines of known and fixed external diameters, a clamp having different shoe dimensions is required for pipelines of different diameters. Clamps of this type are therefore unsuitable for use with tubulars of varying diameters.

Furthermore, whilst the clamp shoes are effective in avoiding ovalisation or collapse of such a pipeline, they are incapable of applying a substantially uniform radial load around the circumference of the pipe. This is because the radially oriented pistons exert a greatest radial load on the pipe in a direction parallel to the axis of the piston. At points on the shoe spaced from the piston axis (and spaced circumferentially around the pipeline), the piston exerts a smaller load. This ultimately leads to variations in the local loading on the pipeline around the circumference of the pipe.

Pipelines laid using such a clamp typically have diameters in the range of 0.150 m to 0.6 m and diameter to thickness ratios of between 10 and 20, and are therefore relatively strong. However, in wind turbine towers, the diameters are often significantly larger than this, and the towers taper toward the top. Indeed, the majority of current turbine towers have a diameter of about 4 m to 5 m at the bottom and about 2.5 m to 3 m at the top, and diameter to thickness ratios of between 165 and 295. Also, current turbine towers have a circumference of 15.7 m at the bottom and 8 m at the top, a difference of 7.7 m. Future towers are likely to have diameters of approximately 11 m at the base tapering to 3 m at the top. The circumference of such towers will therefore vary between approximately 34.5 m and 9.5 m, a difference of 25 m.

Wind turbine towers are therefore relatively thin walled when compared to pipelines, and are unable to retain their circularity when subjected to variations in loads around their circumference, and are thus inherently prone to local buckling and collapse. Indeed, this causes problems during the transportation of wind turbine towers, as the tower sections tend to flex and ovalise, as discussed in U.S. Pat. No. 6,592,331 (Wobben). For this reason, and for the reason that the towers taper from the bottom up, it would not be possible to utilise a clamp of the type disclosed in US2002/0009333, having fixed radius shoes, on wind turbine towers.

German patent publication no. 19647515 (Otto) discloses a mechanism for use in the construction of a wind turbine. The mechanism is used to install sections of the wind turbine tower one above the other to assemble the tower, and to subsequently install a power unit head at the top of the tower.

In general terms, the mechanism includes a fixed, rigid arcuate foot which is coupled to the tower and which is raised up the tower using a crane coupled to the foot. However, the foot is coupled to the tower in a fashion that will lead to variations in the loading on the tower around its circumference (point loads) which, as discussed above, is incapable of supporting such loading. Indeed, the invention, the mechanism is incapable of exerting a uniform radial load on the turbine tower, and local buckling is likely in use.

For example, in one embodiment of DE 19647515, the foot of the mechanism is coupled to the tower by a number of cables which extend around the tower from the clamp, and which are tensioned by hydraulic pistons mounted on the foot. When the pistons are actuated, the loads exerted on the tower by the foot and the cables is not a uniform radial load, and variations in loading will result, leading to loss of circularity and local buckling.

Additionally, in use of the mechanism of DE 19647515, the self weight of the crane and indeed external loads carried by the mechanism (such as sections of the tower) will generate cantilever loads, which are transmitted to the tower by the foot. These cantilever loads will induce local reactionary radial loads in the tower, also leading to loss of circularity and local buckling.

Furthermore, even if the tower is capable of bearing such cantilever loads, the high weight of the mechanism requires such a large clamp force to be exerted on the tower that there is likelihood of global failure of the tower structure.

It is amongst the objects of embodiments of the present invention to obviate or mitigate at least one of the foregoing disadvantages.

According to an aspect of the present invention, there is provided a clamp for a tubular, the clamp comprising:
  at least one clamp member adapted to grip the tubular; and
  at least one flexible elongate energising element adapted to exert a force on the clamp member to urge the clamp member to grip the tubular;
  whereby the clamp member and the energising element are adapted to exert a substantially uniform radial clamp load on the tubular that is independent of external loads applied to the clamp.

Exerting a substantially uniform radial clamp load facilitates generation of a substantially uniform hoop stress in the tubular. This overcomes problems associated with prior clamps and other mechanisms by avoiding or at least minimising variations in the loading around the circumference of the tubular, thereby avoiding or reducing the likelihood of local buckling. It will be understood that references herein to exertion of a substantially uniform radial clamp load on the tubular are to exertion of forces on a surface of the tubular around a circumference thereof, the forces directed along radii of the tubular and being substantially uniform around the circumference of the tubular. The radial clamp load is independent of external loads applied to the clamp in that there is no or substantially no increase/decrease in the clamp load caused when an external load is borne by the clamp. Furthermore, the structure of the clamp is such that the energising elements are isolated from any other force, and in particular, are isolated from external loads exerted upon the clamp.

It will also be understood that reference herein to a tubular are to a hollow member or structure which is typically a thin-walled, elongate member, such as a wind-turbine tower.

According to a further aspect of the present invention, there is provided a clamp for a tubular, the clamp comprising:

at least one clamp member adapted to grip the tubular; and a plurality of flexible elongate energising elements adapted to be tensioned for exerting a force on the at least one clamp member to urge the clamp member to grip the tubular, the clamp member and the energising element adapted to exert a substantially uniform radial clamp load on the tubular that is independent of external loads applied to the clamp;

wherein the energising elements are adapted to be spaced in a direction along a main axis of the tubular; and wherein at least one of the energising elements is adapted to be tensioned by application of a tensile force directed in a circumferential direction around the tubular opposite to that of another energising element.

The flexible elongate energising elements facilitate exertion of a substantially uniform radial load, and thus a uniform induced hoop stress in the tubular. However, some variation in the tension in the energising elements may occur along the length of the element, due to friction between the energising element and the surface of the tubular. Indeed, the inventors have found that the tension in the energising element may be greatest nearest to the point of application of the tensile load (the energising element typically being tensioned by a winch or the like), and lessens along the length of the energising element away from the point of application. By tensioning at least one of the energising elements through application of a tensile force directed in an opposite circumferential direction around the tubular to that of another energising element, variations in the radial loads exerted upon the tubular by the clamp (and thus in induced hoop stress), due to variations in the tension in the energising elements, can be avoided or at least minimised.

The energising elements may have first and second ends, one of said ends adapted to be coupled, secured or fixed relative to a support structure of the clamp, and the other end adapted to be coupled to a winch or the like for tensioning the energising element. At least one of the energising elements may be tensioned by application of a tensile force on an opposite end to that of another energising element. Thus the first end of one of the energising elements may be tensioned to generate a tensile load in a first circumferential direction around the tubular, and the respective second end of another energising element may be tensioned to generate a tensile load in a second circumferential direction around the tubular, opposite to said first direction. It will be understood that a number of energising elements may be tensioned in the first direction, and a number of others in the second direction. For example, axially adjacent energising elements may be tensioned in opposite directions. Alternatively, an axially adjacent pair (or more) of energising elements may be tensioned in an opposite direction to another, optionally adjacent, pair of energising elements. Alternatively, both ends of the energising elements may be adapted to be tensioned.

According to a further aspect of the present invention, there is provided a clamp for a tubular, the clamp comprising:

at least one clamp member adapted to grip the tubular; and a plurality of flexible elongate energising elements adapted to be tensioned for exerting a force on the at least one clamp member to urge the clamp member to grip the tubular, each energising element adapted to pass around a circumference of the tubular and to overlap in a direction spaced along a main axis of the tubular, the clamp member and the energising element adapted to exert a substantially uniform radial clamp load on the tubular that is independent of external loads applied to the clamp;

wherein the overlap location of at least one of the energising elements is adapted to be spaced around a circumference of the tubular relative to the overlap location of another energising element.

As noted above, variations in the tension in the energising elements may occur along the length of the energising element. However, spacing the overlap locations around the circumference of the tubular facilitates minimisation of variations in the resultant radial load on the tubular, and thus minimisation of variations in the induced hoop stress. It will be understood that the overlap locations of the energising elements are spaced around the circumference of the tubular by appropriate positioning of the energising elements around the clamp. The overlap locations of the energising elements may be adapted to be spaced equidistantly around the circumference of the tubular. For example, where the clamp includes two energising elements, the overlap locations may be spaced 180 degrees apart around the circumference of the tubular; and where the clamp includes three energising elements, the overlap locations may be spaced 120 degrees apart. The clamp may comprise a plurality of energising elements having the same overlap locations, for example, a pair of axially adjacent energising elements may have the same overlap locations, which may be circumferentially spaced relative to the overlap locations of an adjacent pair of energising elements. In preferred embodiments of the invention, the clamp comprises four such pairs of energising elements, and the overlap locations of the pairs of energising elements are spaced 90 degrees apart around the circumference of the tubular. This may facilitate application of a substantially uniform radial load on the tubular whilst providing a clamp of minimal dimensions and weight. In an alternative, axially adjacent energising elements may have circumferentially spaced overlap locations.

According to a further aspect of the present invention, there is provided a clamp for a tubular, the clamp comprising:

a plurality of clamp members adapted to grip the tubular; and at least one flexible elongate energising element adapted to exert a force on the clamp members to urge the clamp members to grip the tubular;

wherein the clamp members are each adapted to be located between the tubular and the energising element; and wherein the clamp members and the energising element are adapted to exert a substantially uniform radial clamp load on the tubular that is independent of external loads applied to the clamp.

By locating the clamp members between the tubular and the energising element, each of the clamp members may be energised to the same degree by the energising element. This may facilitate generation of a uniform radial load on the tubular, without causing the clamp members to impart point loads on the tubular that would lead to local buckling, either during location of the clamp on the tubular, or in use, when an external load is borne by the clamp.

The energising element may be adapted to pass around a circumference of the tubular, and may therefore extend around rear (relative to the tubular) surfaces of the clamp members, to thereby encircle the tubular.

According to a further aspect of the present invention, there is provided a clamp for a tubular, the clamp comprising:
- at least one clamp member adapted to grip the tubular;
- at least one flexible elongate energising element adapted to exert a force on the clamp member to urge the clamp member to grip the tubular, the clamp member and the energising element adapted to exert a substantially uniform radial clamp load on the tubular that is independent of external loads applied to the clamp; and
- a support structure coupled relative to the clamp member such that, in use, an external load exerted on the support structure at a location spaced laterally from a main axis of the tubular causes the clamp member to induce a substantially axially directed reaction load in the tubular.

By coupling the support structure relative to the clamp member in this fashion, an external load exerted on the support structure at a location spaced laterally from a main axis of the tubular (a cantilever load) cannot induce a moment in or about the clamp member. This avoids or at least minimises generation of a reactive radial point load on the tubular due to the external loading.

Furthermore, the support structure does not react the radial clamp load imparted on the tubular. This is in contrast, for example, to the mechanism of DE 19647515, where the foot must be capable of bearing the high loading transmitted to the wind-turbine tower using the pistons, which requires the foot to be large and, consequently, relatively heavy, with associated disadvantages.

In prior art clamps and structures such as the mechanism of DE 19647515, cantilever loads are exerted on a tubular which are reacted radially by the tower, leading to variations in loading around the circumference of the tubular and, ultimately, local buckling. The clamp may comprise a plurality of clamp members. Providing a support structure coupled relative to a plurality of clamp member in this fashion operatively associates the clamp member with each other, and thereby avoids or at least minimises any reactive radial load being generated in the tubular when an external load is exerted on the clamp at a location spaced laterally from a main axis of the tubular. In particular, such reactive radial loads are avoided or minimised when a cantilever load is applied to the support structure (a load supported at one end only). This is because the external load is borne by induced axial reactive loads in the tubular, as the clamp members exert loads which are purely or largely directed parallel to a main axis of the tubular. This facilitates maintenance of a substantially uniform radial clamp load, and thus a substantially uniform hoop stress in the tubular.

The support structure may be rotatably or pivotably coupled relative to the clamp members, through a pin joint, ball-joint or the like, which may facilitate transmission of a load on the clamp members in a direction parallel to a main axis of the tubular, but which may substantially prevent transmission of radial loads to the clamp members due to the external load.

The support structure may include a support member associated with the clamp member for exerting a positioning force on the clamp member to position the clamp member relative to the tubular wherein, in use, a positioning force exerted on the clamp member by the support member is released before the clamp member is urged to grip the tubular by the energising element. The support member may be rotatably or pivotably coupled to a frame of the support structure to facilitate positioning of the clamp member. The support member may be adapted to be secured against rotation relative to the frame to permit the frame to support an external load, and may therefore be locked or restrained before the clamp is used to support an external load.

According to a further aspect of the present invention, there is provided a clamp for a tubular, the clamp comprising:
- at least one clamp member adapted to grip the tubular; and
- at least one flexible elongate energising element adapted to exert a force on the clamp member to urge the clamp member to grip the tubular, the clamp member and the energising element adapted to exert a substantially uniform radial clamp load on the tubular that is independent of external loads applied to the clamp;
- wherein the energising element is adapted to pass around a circumference of the tubular and to overlap in a direction spaced along a main axis of the tubular;
- and wherein the energising element is adapted to extend from the overlap location in a direction substantially parallel to a tangent of the tubular at the overlap location.

The energising element is adapted to be tensioned to exert the force upon the clamp member. Portions of the energising element extend away from the tubular from the overlap location; this facilitates, inter alia, use of the clamp with tubulars of various different diameters, and indeed use on a tubular of varying diameter, as the energising element is capable of encompassing tubulars of a range of different diameters. Arranging the energising element to extend from the overlap location in a direction substantially parallel to a tangent of the tubular at said location facilitates application of tensile forces on said portions of energising element directed substantially parallel to said tangent. This avoids or at least minimises generation of any moment in the tubular because: 1) the forces in the portions of the energising element extending away from the tubular are substantially parallel to said tangent of the tubular but directed in opposite directions, and thus tensile loads in these portions react against each other; and 2) as the energising element substantially encircles the tubular and the portions of the energising element are so located, little or no moment is generated about the tubular when the energising element is tensioned.

The energising element may extend from the overlap location in first and second opposite directions, each direction substantially parallel to said tangent of the tubular. Said first and second directions may be within 0 to 10 degrees, preferably 0 and 5 degrees of the tangent, and the term substantially parallel should be construed accordingly.

The clamp member may be located between the tubular and the energising element, and the overlap location of the energising element may be radially spaced between, say, 5 mm and 50 mm, optionally between 10 mm and 20 mm, from an external surface of the tubular, said distance determined by factors including the thickness of the clamp member.

The energising element may extend from the overlap location to a sheave, pulley or the like and from there to a winch or the like for tensioning the energising element.

According to a further aspect of the present invention, there is provided a clamp for a tubular, the clamp comprising:
- at least one clamp member adapted to grip the tubular;
- a support member associated with the clamp member for exerting a positioning force on the clamp member to position the clamp member relative to the tubular; and
- at least one flexible elongate energising element adapted to exert a force on the clamp member to urge the clamp member to grip the tubular, the clamp member and the energising element thereby adapted to exert a substantially uniform radial clamp load on the tubular that is independent of external loads applied to the clamp;

wherein, in use, a positioning force exerted on the clamp member by the support member is released before the clamp member is urged to grip the tubular by the energising element.

The clamp member can therefore be positioned relative to the tubular by exertion of a positioning force on the clamp member, and the positioning force released prior to exertion of a clamp load on the tubular. This conforms the clamp member to the surface of the tubular and prevents or minimises variation in the loading on the tubular due to misalignment of the clamp member relative thereto. This thereby avoids or minimises the likelihood of the clamp member causing variations in the loading on the tubular tending to lead to local buckling.

The clamp may comprise at least one pair of clamp members which are adapted to be located spaced across a diameter of the tubular and operatively associated such that, in use, an external load exerted on the clamp at a location spaced laterally from a main axis of the tubular causes the clamp members to induce substantially axially directed reaction loads in the tubular. The clamp members may be operatively associated with each other through a support structure coupled relative to the clamp members, the support structure comprising a support member associated with each clamp member.

The support member may be pivotably coupled to the clamp member, preferably through a ball-joint, which prevents a turning moment being transmitted between the support structure and the clamp member. The support member may alternatively be coupled through a pin-joint. The clamp may further comprise first and second support members in the form of arms, each arm pivotably coupled to the clamp member, the first and second arms serving for positioning the clamp member at a desired radial location relative to a surface of the tubular, and for positioning a gripping surface of the clamp member substantially parallel to, or coplanar with, the surface of the tubular.

It should be noted that the support member is coupled to the clamp so as to ensure that no clamping force exists in the support member, when the clamp is actuated.

According to a further aspect of the present invention, there is provided a clamp for a tubular, the clamp comprising:
a plurality of flexible clamp members adapted to grip the tubular; and
at least one flexible elongate energising element adapted to exert a force on the clamp members to urge the clamp members to grip the tubular;
wherein the clamp members and the energising element are adapted to exert a substantially uniform radial clamp load on the tubular that is independent of external loads applied to the clamp;
and wherein the clamp members are dimensioned to substantially encircle a circumference of the tubular.

By dimensioning the clamp members to substantially encircle the tubular, the clamp load exerted upon the tubular may be directed through the clamp members. In this fashion, a substantially complete ring comprised of the clamp members may be formed around the circumference of the tubular, facilitating application of a uniform clamp load on the tubular, and reducing the likelihood of generation of variations in loading on the tubular tending to lead to local buckling.

The tubular may be tapered along a length thereof, and may therefore be of varying diameter. The clamp members may be dimensioned to substantially encircle the tubular at a desired position along a length thereof, and may therefore be configured to encircle a defined or predetermined circumference of the tubular. The tubular may be a wind-turbine tower, and the predetermined circumference may be at a desired operating location for the clamp, which may be an operating height where it is desired to locate the clamp for subsequently carrying out a desired procedure. This procedure may be a maintenance or installation procedure, and may involve supporting an external load from the tower using the clamp, such as when a component of the turbine is removed for maintenance or subsequently reinstalled.

The dimensions of the clamp member may be adjustable and/or the clamp members may be releasably coupled relative to a remainder of the clamp to facilitate removal and replacement with an alternative clamp member.

According to a further aspect of the present invention, there is provided an assembly comprising two clamps coupled together by a coupling which facilitates adjustment of a distance between the clamps, to facilitate advancement of the assembly along a length of a tubular, wherein the clamps each comprise a clamp as defined in any of the above aspects of the invention.

According to a further aspect of the present invention, there is provided a self-advancing climbing device for mounting on a tubular column, the assembly comprising two clamps coupled together by a coupling which facilitates adjustment of a distance between the clamps, to facilitate advancement of the assembly along a length of the column, wherein the clamps each comprise a clamp as defined in any of the above aspects of the invention.

The tubular column is preferably the tower of a wind-turbine.

According to a further aspect of the present invention, there is provided a method of coupling a clamp to a tubular, the method comprising the steps of:
locating a clamp around the tubular, the clamp having at least one clamp member and at least one flexible elongate energising element; and
tensioning the energising element to exert a force on the clamp member, to urge the clamp member to grip the tubular and thereby apply a substantially uniform radial clamp load on the tubular that is independent of external loads applied to the clamp.

According to a further aspect of the present invention, there is provided a method of climbing a tubular column comprising the steps of:
providing a climbing device comprising upper and lower clamps coupled to each by an adjustable coupling, each clamp having at least one clamp member and at least one flexible elongate energising element;
securing the upper clamp to the tubular by tensioning the respective upper energising element to exert a force on the respective upper clamp member, to urge the clamp member to grip the tubular and thereby apply a substantially uniform radial clamp load on the tubular that is independent of external loads applied to the clamp;
securing the lower clamp to the tubular by tensioning the respective lower energising element to exert a force on the respective lower clamp member, to urge the clamp member to grip the tubular and thereby apply a substantially uniform radial clamp load on the tubular;
releasing the upper clamp from the tubular;
increasing a distance between the upper and lower clamps using the adjustable coupling, to advance the upper clamp along a length of the tubular;
resecuring the upper clamp to the tubular;
releasing the lower clamp from the tubular;

shortening the distance between the upper and lower clamps, to advance the lower clamp along a length of the tubular; and resecuring the lower clamp to the tubular.

Further features of the present invention are defined in the accompanying claims. However, it will generally be understood that the features of one or more of the above aspects of the invention may be provided singly or in combination.

According to a further aspect of the present invention there is provided a method of clamping one or more friction surfaces to the external surface of a tubular structure, without damage to the structure or surface of the tubular structure, by applying a substantially uniform radial load over the circumference of the tubular structure using the apparatus of the first aspect of the present invention.

According to a further aspect of the present invention there is provided a method of clamping friction surfaces to the external surface of a thin walled tubular structure, without damage to the structure or the coatings by the application of controlled radial loading such that the effect upon the buckling behaviour of the tubular structure is the same as that of applying a substantially uniform radial load to the complete circumference, thereby enabling the maximum possible axial load to be applied to the fixed clamp without buckling the tubular structure due to the combined axial and radial loads.

According to a further aspect of the present invention there is provided apparatus for clamping one or more friction surfaces to a tubular structure, the apparatus comprising a frame which can be assembled around the tower structure, means for moving the one or more friction surfaces relative to the frame, and means for applying a load to the one or more friction surfaces.

Preferably the apparatus applies a substantially uniform radial load over the entire circumference of the tubular structure.

Preferably the apparatus can accommodate variations in circumference and taper along the length of the tubular structure.

Preferably the one or more friction surfaces are friction pads.

Preferably the one or more friction pads are manufactured from a metal or composite material.

Preferably the one or more friction pads have at least one surface manufactured from a natural or elastomeric friction material, which is presented to the tubular structure.

Preferably the one or more friction pads are flexible and conform to the shape of the tubular structure.

The means for moving the one or more friction surfaces relative to the frame typically comprises one or more-load arms.

Movement of the load arm in a first direction acts to bring the friction surface into contact with the surface of the tubular structure. Movement of the load arm in a second, opposite direction brings the friction surface out of contact with the surface of the tubular structure.

Preferably each of the one or more load arms is moved by the action of a hydraulic cylinder.

Preferably each of the one or more friction surfaces is connected to a load arm.

Preferably each of the one or more friction pads has a spine to which the load arm is connected.

In one embodiment the means for applying a radial load to the one or more friction surfaces comprises one or more tendons. Each tendon typically takes the form of a flexible elongated article to which load may be applied.

The tendons may be manufactured from a suitable material such as fibre rope, wire rope, webbing, chain, or steel strip.

Preferably the one or more tendons are passed around the full circumference of the tubular structure.

Typically the one or more tendons are passed around the full circumference of the tubular structure such that friction surfaces are positioned between the surface of the tubular structure and the one or more tendons.

Preferably the spine of each of the one or more friction surfaces has apertures through which the one or more tendons can be passed.

Preferably each of the load arms has at least one winch which can be used to tension the one or more tendons. Where the tendons are tensioned using the winch a radial load is applied to the friction surface such that it is pressed against the tubular structure.

Preferably intimate contact between the one or more friction surfaces and the tubular structure can be maintained in spite of changes in diameter and taper angle of the tubular structure by a lever system positioned by power actuators together with deflection of the friction pads under the influence of the radial load applied by the one or more tendons.

In another embodiment the means for applying a radial load to the one or more friction surfaces comprises a circumferential array of linear actuators.

Preferably twelve or more linear actuators are provided in the array.

Optionally, the linear actuators act in unison to apply uniform load to the one or more friction surfaces distributed around the circumference of the tubular structure through linkages attached to the frame which is assembled around the tubular structure.

Alternatively the linear actuators act in unison to apply equal load to friction pads evenly distributed around the circumference of the tubular structure by direct radial displacement, the load being reacted by the frame which is assembled around the tubular structure.

In a further embodiment the means for applying a radial load to the one or more friction surfaces comprises a bladder.

Preferably the bladder encircles the tubular structure.

The bladder may take the form of a tube with closed ends.

There may also be provided means for altering the length of the bladder tube. Preferably the means for altering the length of the bladder tube is a reel.

The bladder is internally pressurised by a fluid.

Optionally the bladder is manufactured from a material with a Poisson's Ratio sufficiently high to enable radial expansion to create a sufficient circular shortening (for example, approaching 1), such that changes in circumference of the tubular structure can be accommodated by altering the geometry of the bladder without changing the amount of bladder material used to encompass the tubular structure.

Preferably the bladder is restrained at its outer diameter by the frame which is assembled around the tubular structure.

In a further embodiment the means for applying a radial load to the one or more friction surfaces comprises one or more wedges which act on arms, linkages or pistons arranged to move the one or more friction surfaces radially against the surface of the tubular structure.

Each of the one or more friction surfaces may also be connected to an alignment member. The alignment member typically takes the form of an arm connected to the opposite end of the spine to the load member. Preferably the alignment arm is moved by the action of a hydraulic cylinder.

Preferably the angle between the vertical and the friction surface can be altered by virtue of the movement of the alignment arm.

Optionally lifting and manipulating tools may be attached to the apparatus.

Optionally man-riding facilities may be attached to the apparatus.

Optionally a first apparatus of the present invention may be connected to a second apparatus of the present invention by linear actuators aligned parallel to the axis of the tubular structure such that the first and second apparatus may be spaced apart axially or drawn together.

The motion and clamping of the first and second apparatus may be so coordinated as to produce a linear motion of the assembly along the axis of the tubular structure.

The first and second apparatus can be used to transport articles parallel to the axis of the tubular structure.

According to a further aspect of the present invention there is provided a method of clamping one or more friction surfaces to the external surface of a tubular structure, without damage to the structure or surface of the tubular structure, by the application of a substantially uniform radial load over the circumference of the tubular structure using the apparatus of the second aspect.

Typically the tubular structure is thin walled.

The tubular structure may be a wind turbine tower.

Advantageously, by applying a substantially uniform radial load over the circumference of the tubular structure a greater axial load can be applied to the friction pads without buckling the tubular structure due to the combined axial and radial loads.

According to a further aspect of the present invention there is provided a method of increasing the axial load capacity of a friction clamp, used on a wind turbine tower, by increasing the buckling capacity of the tower without significantly changing the natural frequency of the tower.

Preferably the buckling capacity of the wind turbine tower is increased by the use of internal stiffening rings.

Preferably the internal stiffening rings are formed from a steel or plastic composite material.

Optionally the stiffening rings are held in place by friction. Alternatively the stiffening rings are held in place by adhesive or welding.

Embodiments of the present invention will now be described, by way of example only, with reference to the following drawings, in which.

As will be described below, the apparatus and method of the present invention offers significant advantages over prior clamps for tubulars, and over prior mechanisms which are coupled to thin-walled tubulars, in particular, wind-turbine towers.

Figures 1, 2:
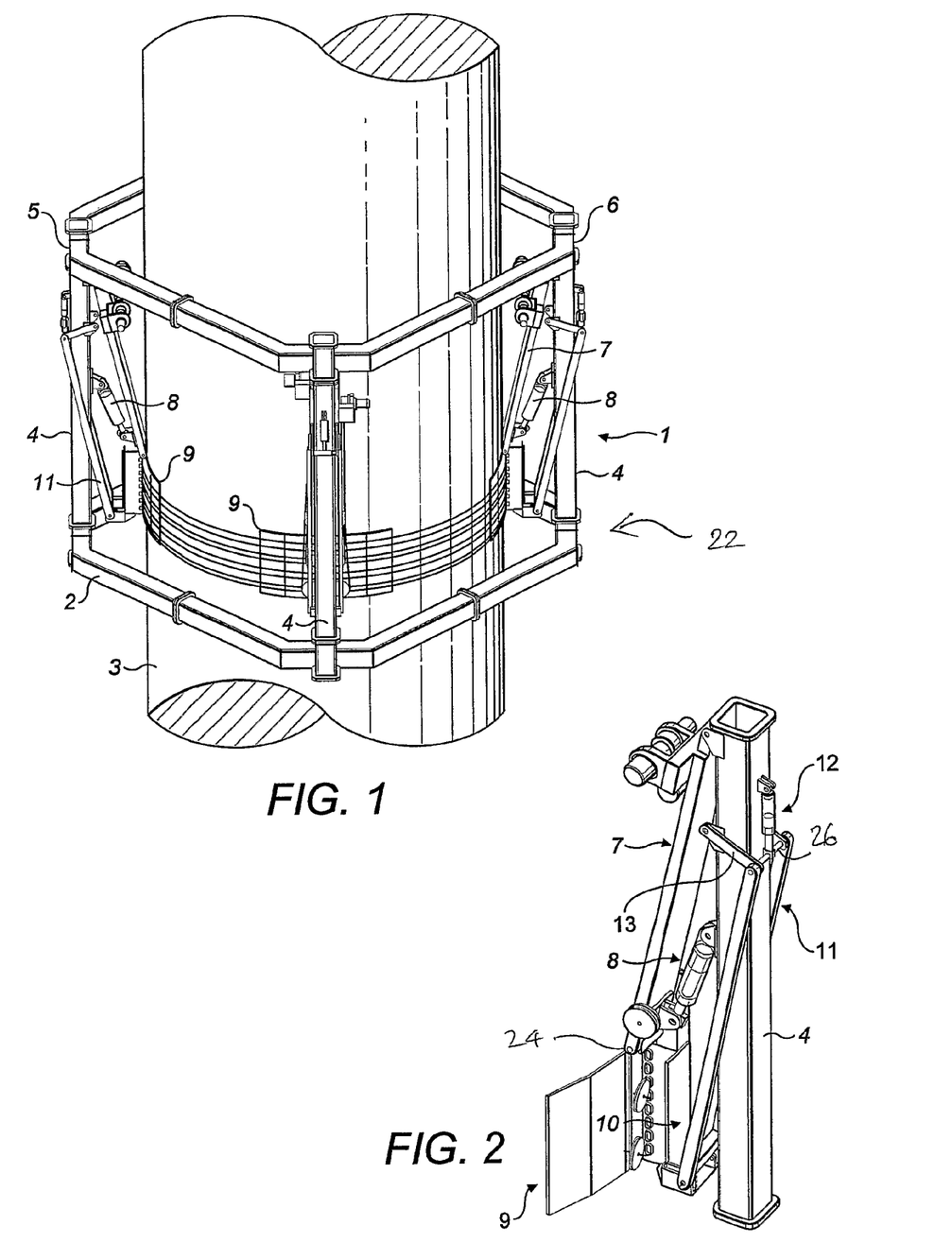
FIG. 1 is a perspective view of a clamp in accordance with an embodiment of the present invention, the clamp illustrated following coupling to a tubular in the form of a wind-turbine tower.
FIG. 2 is an enlarged view of a clamp member and a section of a support structure, forming part of the clamp of FIG. 1.

Referring to FIG. 1, there is shown a clamp/apparatus 1 for a tubular, which in the illustrated embodiment takes the form of a thin-walled, tapered wind-turbine tower 3. The clamp 1 comprises at least one clamp member or friction pad 9 which is adapted to grip the tower 3, and which is shown in more detail in the enlarged view of FIG. 2. The clamp 1 also comprises at least one flexible elongate energising element in the form of a tendon 16, which is shown in more detail in the view of FIG. 3. The tendon 16 is adapted to exert a force on the friction pad 9 to urge the pad 9 to grip the tower 3, such that the friction pad 3 and the tendon 16 exert a substantially uniform radial clamp load on the tubular. The friction pad 9 thereby restrains the clamp 1 against movement relative to the tower 3 in a direction along a length thereof, enabling an external load to be supported from the tower 3 using the clamp 1.

Using the clamp 1 to exert a substantially uniform radial clamp load on the tower 3 facilitates generation of a substantially uniform hoop stress in the tower. This overcomes problems associated with prior clamps and other mechanisms by avoiding or at least minimising variations in the loading around the circumference of the tubular, thereby avoiding or reducing the likelihood of varied point-loads leading to local buckling.

It will also be understood that the method herein described dramatically improves the performance of a clamp by applying the maximum possible radial loads to friction pads through the application of uniform radial load, so that circularity of a thin-walled tubular structure is retained. These loads are far beyond the capability of discrete loaded pads, as currently used.

In more detail, the clamp/apparatus 1 comprises a support structure 22 having a substantially rectangular lower ring beam 2, which is assembled round the base of the tower 3, a plurality of vertical columns, uprights or corner posts 4 and a substantially rectangular upper ring beam 5. Typically the upper ring beam 5 is attached to the top of the vertical columns 4 at each corner so as to provide a rigid cuboid framework 6 that encompasses the tower 3.

Each of the vertical columns 4 is connected at its top end to a first support member or rigid load arm 7, which is moved by a hydraulic cylinder 8 connected between the vertical column 4 and the arm 7, as shown in FIG. 2.

In the preferred embodiment illustrated in the drawings, the clamp 1 includes four friction pads 9 which are located spaced equidistantly around a circumference of the tower 3. The friction pads 9 are made of a compliant natural or elastomeric friction material, such as neoprene rubber or polyurethane, bonded to a stiff but flexible sheet of metallic or composite material to which load may be applied, such as a sheet of steel, and have vertical rigid spines 10 at their centre. The spines 10 are each pivotably connected at their upper ends to the lower end of a respective arm 7, via a pin joint or ball-joint 24. A ball-joint is preferred over a pin-joint, as the ball joint facilitates transmission of a load on the clamp members in a direction parallel to a main axis of the tubular, but substantially prevents transmission of radial loads to the clamp members due to the external load.

The arms 7 are in-turn pivotably attached to the vertical columns 4, in a manner that allows them to pivot with respect to the tower 3. By this arrangement, the load arms 7 are coupled relative to the friction pads 9 so as to facilitate application of a positioning force on the pads 9, whereby movement of the load arm 7 brings the respective friction pad 9 adjacent to and/or into contact with the surface of the tower 3. This allows the pads 9 to contact the surface of the tower 3 and to take up the taper angle, or to be vertically oriented, as appropriate.

The support structure 22 also includes a second support member or alignment arm 11 associated with each friction pad 9, each alignment arm 11 being pivotably connected to the respective vertical column 4 through a link 13, via a pivot pin 26. The arm 11 is also pivotably coupled to the pad 9 at the lower end of the spine 10 (i.e. at the end of the spine 10 opposite to the end that the load arm 7 is connected to). A second hydraulic cylinder 12 is connected between the vertical column 4 and the pivot pin 26 and thus acts to move the link 13. Accordingly, by extending or retracting the link cylinder 12, the angle between the vertical column 4 and the pad 9 can be changed to suit differing tower taper angles. The position of the pads 9 relative to the tower 3 can therefore be adjusted using a combination of the load arm 7 and the alignment arm 11, so that the clamp 1 can be adjusted to accommodate variations in the circumference/diameter and taper angle of the tower 3. This therefore facilitates use of the clamp 1 with towers of different diameters, and indeed with towers that taper along their length.

Figure 3:
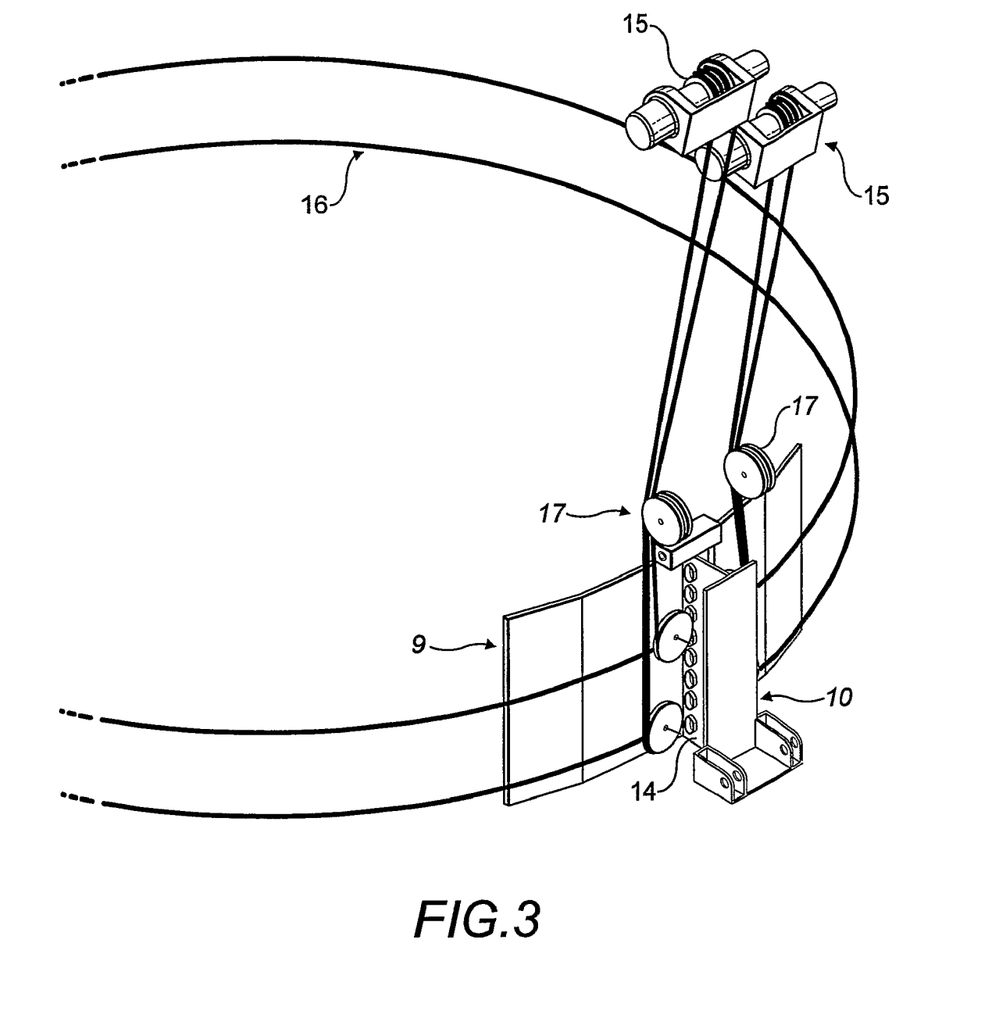
FIG. 3 is an enlarged view of the clamp member and a energising element, forming part of the clamp of FIG. 1.

As shown in FIG. 3, the clamp includes a plurality of tendons, and in the illustrated embodiment, includes eight tendons 16, two tendons 16 associated with each load arm 7 of the clamp 1. The tendons 16 are each tensioned by a respective winch 15, and two such winches 15 are mounted on each load arm 7. This arrangement allows the tendons 16 to compensate for the change in circumference of the tower 3. Each tendon 16 is passed from an anchor point on the load arm 7 or winch 15, and extends through ports 14 in the spine 10 of each pad 9 and back to the winch 15 on the same load arm 7. Accordingly, two tendons 16 originate and end at each load arm 7.

The tendons 16 each encircle the circumference of the tower 3 and cross over and thus overlap in a direction along a length of the tower 3, at an overlap location 38. As shown in more detail in the further enlarged view of FIG. 4, the pads 9 are each located between the surface of the tower 3 and the tendons 16, and the tendons overlap or cross at the spine 10 of the pad 9 attached to the respective load arm 7, so that the tendon 16 is in contact with the tower 3 or pad 9 as it passes around the full circumference of the tower 3. The tendons are typically manufactured of low friction, high performance fibre rope, wire rope, webbing, chain or steel. Sheaves 17 are provided to turn the tendon 16 from its circumferential passage to the anchor point and winch 15.

As the tendons 16 are tensioned by the winches 15, the tendons 16 exert a force on the friction pads 9 to urge the pads to grip the tower 3. Once the clamp 1 has been securely coupled to the tower 3, the pads 9 serve to restrain the clamp against axial movement relative to the tower 3 and, as noted above, thus provide a contact force that provides sufficient friction for useful axial load to be supported.

In essence, the tendons 16 are arranged round the outside of the pads 9 so that when they are pulled tight they "pull" the pads into the tower 3, and the pads 9 and tendons 16 together impart a substantially uniform radial clamp load on the tower 3. This induces as close to a true hoop load/stress in the tower 3 as can be practically arranged.

The clamp load on the tower 3 is released by paying out the winches 15, thereby releasing or reducing the force exerted on the pads 9 by the tendons 16. The cylinders 8, 12 are then actuated to move the load and alignment arms 7 and 11, and thus the pads 9, away from the tower 3. This movement carries the tendons 16, which are further paid out as required, so that the tendons 16 may be drawn clear of the tower surface.

The pads 9 are dimensioned so as to contact almost the entire circumference of the tower 3 at or towards the top of the tower, whilst at locations towards the bottom of the tower 3, the pads are separated due to the increased diameter of the tower, as shown in FIG. 1.

There follows a further detailed description of the structure and method of operation of the clamp of the present invention, and of consequent advantages afforded in operation of the clamp.

As noted above, the friction pads 9 are located between the tower 3 and the tendons 16, which enables each of the pads 9 to be energised to the same degree by the tendons 16. This facilitates generation of a uniform radial load on the tower 3, without causing the pads 9 to impart point loads on the tower 3 that would lead to local buckling, either during location of the clamp 1 on the tubular, or in use, when an external load is borne by the clamp 1.

Figure 4:
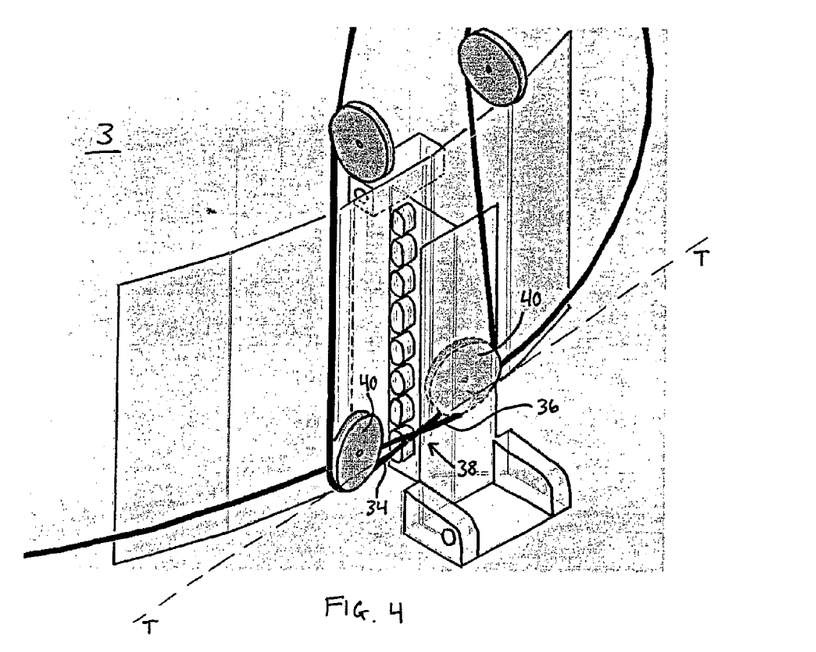
FIG. 4 is a further enlarged view of the clamp member and energising element shown in FIG. 3, with certain parts shown in outline, for illustration purposes.
Figure 5:
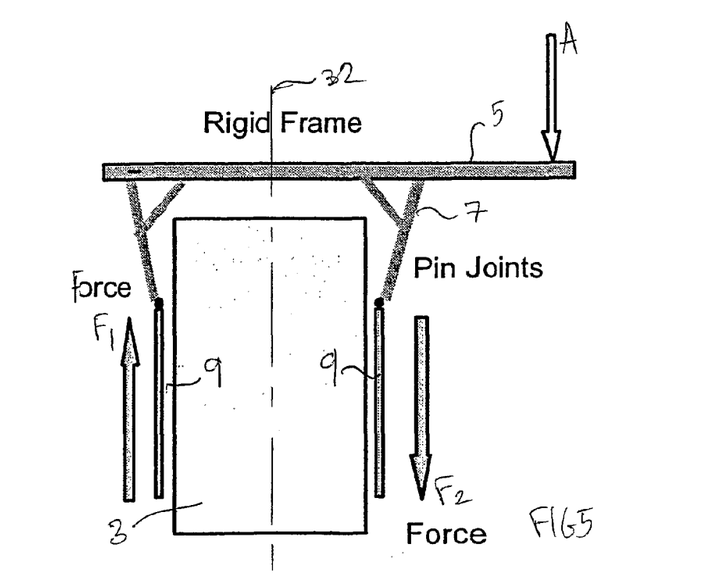
FIG. 5 is a schematic illustration of the clamp of FIG. 1 shown in use supporting an external load.

As will be noted from FIGS. 1 to 4, the clamp 1 includes two pairs of pads 9, each pair spaced-across a diameter of the tubular such that each pad 9 is spaced 90 degrees apart. The pads 9 are operatively associated with each other in an axial couple through the support structure 22, as the pads 9 are each pivotably coupled to the arms 7, and the arms 7 pivotably coupled to the corner posts 4. This avoids or at least minimises any reactive radial load being generated in the tower 3 when an external load A is exerted on the clamp 1 at a location spaced laterally from a main axis 32 of the tubular (a cantilever load), as shown in FIG. 5, which is a schematic illustration of the clamp 1 in use. Such a load A may be exerted on the clamp 1, for example, during construction of the tower 3, or during maintenance, when a load such as a section of the tower 3 is raised using a crane or the like coupled to the clamp 1.

This is because the external load A generates axial loads F1 and F2 in the pads 9, which thereby induce reactive loads in the tower 3 directed parallel to a main axis 32 of the tower 3. The friction pads 9 thus exert loads which are purely or largely directed parallel to the tower main axis 32. This axial couple facilitates maintenance of a substantially uniform radial clamp load, and thus a substantially uniform hoop stress in the tower.

Also, as noted above, the clamp tendons 16 are tensioned to exert a force upon the pads 9, to generate the uniform radial clamp load. As shown in FIG. 4, portions 34 and 36 of each tendon 16 extend away from the tower 3 from an overlap location 38 in a direction substantially parallel to a tangent T of the tower 3 at said location. Through this arrangement, when the winches 15 are actuated to tension the tendons 16, a tensile force is exerted on the tendons 16 which is directed substantially parallel to said tangent.

This avoids or at least minimises generation of any moment in the tower 3 because: a) the forces in the portions 34, 36 of the tendons 16 extending away from the tower 3 are parallel to said tangent T but directed in opposite directions, and thus tensile loads in the portions 34, 36 react against each other; and b) as the tendons 16 substantially encircle the tower 3 and the portions 34, 36 are so located, little or no moment is generated about the tower 3 when the tendons 16 are tensioned. To facilitate this, the pads 9 are made as thin as possible, such that the overlap location 38 are as close as possible to the surface of the tower 3. The pad 9 thickness may be in the range of 5 to 50 mm, typically 10 to 20 mm, to achieve this. Also, lower sheaves 40 are equally located as close as possible to the rear surfaces of the pads 9, to enable the tendon portions 34, 36 to be oriented substantially parallel to the tower tangent T.

However, whilst it is desired that the tendon portions 34, 36 extend from the overlap location 38 in directions substantially parallel to the tower tangent T, it will be understood that the portions may be oriented within, say, 0 to 10 degrees of the tangent and still function to generate a substantially uniform radial load on the tower 3.

Additionally, it will be understood that some variation in the tension in the tendons 16 may occur along the length of the tendon, due to friction between the tendon 16 and the surface of the tower 3. Indeed, the inventors have found that the tension in the tendons 16 may be greatest nearest to the point of application of the tensile load (the winch 15), and lessens along the length of the tendon 16 away from the point of application of the load.

Accordingly, a number of the tendons 16 are tensioned by application of tensile forces directed in opposite circumferential directions around the tower 3 to other tendons. In this way, variations in the radial loads exerted upon the tower 3 by the clamp 1 (and thus in induced hoop stress), due to variations in the tension in the tendons 16, can be avoided or at least minimised.

To achieve this, the tendons 16 are tensioned by application of tensile forces on opposite ends. Thus the first end of one of the tendons 16 is tensioned to generate a tensile load in a first circumferential direction around the tower 3, and the respective second end of another tendon 16 is tensioned to generate a tensile load in a second circumferential direction around the tower 3, opposite to said first direction. For example, each pair of tendons 16 associated with a respective arm 7 may be tensioned in a first circumferential direction around the tower. The pairs of axially adjacent tendons 16 (relative to the tower axis 32) are tensioned in the opposite circumferential direction. This has the effect of balancing out any variations in loading of the individual tendons 16. In another embodiment, axially adjacent tendons 16 may be tensioned in opposite circumferential directions. Accordingly, the tendons 16 in the pair associated with each arm 7 may be tensioned in opposite directions.

Additionally, the overlap locations 38 of a number of the tendons 16 are spaced around the circumference of the tower, to facilitate minimisation of variations in the resultant radial load on the tower 3, and thus minimisation of variations in the induced hoop stress. In the illustrated embodiment, the overlap locations 38 of the pair of tendons 16 associated with each arm 7 are spaced relative to the overlap locations 38 of an adjacent pair of tendons 16. Specifically, the overlap locations 38 of the pairs of tendons 16 are spaced equidistantly at 90 degree spacings around the circumference of the tower. This facilitates application of a substantially uniform radial load on the tower (by balancing out any variations across a number of adjacent tendons 16), whilst providing a clamp 1 of minimal dimensions and weight. In a variation, the overlap location of axially adjacent tendons 16 may be spaced in a similar fashion around the tower 3 circumference.

Furthermore, as described above, the clamp pads 9 are positioned relative to the tower 3 by exertion of a positioning force on the pads 9. This positioning force is released prior to exertion of a clamp load on the tower, which conforms the pads 9 to the surface of the tower 3 and prevents or minimises variations in the loading on the tower 3 around its circumference, by preventing misalignment of the pads 9 with the tower 3 surface. This avoids or minimises the likelihood of the pads 9 generating non-uniform point loads which could lead to local buckling of the tower 3.

Also, the pads 9 are dimensioned to substantially encircle the tower at a determined circumference. This may be at a desired operating location for the clamp 1, which may be an operating height where it is desired to locate the clamp 1 for subsequently carrying out a desired procedure. The procedure may be a maintenance or installation procedure, and may involve supporting an external load from the tower 3 using the clamp 1, such as when a component of the turbine is removed for maintenance or is subsequently reinstalled.

It will therefore be understood that the clamp load exerted upon the tower 3 at this location is directed through the pads 9. Accordingly, a substantially complete ring comprised of the pads 9 is formed around the circumference of the tower 3, facilitating application of a uniform clamp load on the tower, and reducing the likelihood of generation of variations in loading on the tower 3 tending to lead to local buckling.

Also, the support structure 28 of the clamp 1 is effectively locked once in an operating location and prior to any external load being supported from the clamp. This is achieved by locking the arms 7, using the cylinders 8, once the pads 9 have been urged to grip the tower 3 by the tendons 16. This has the effect of enabling the clamp 1 to support a cantilever load without causing any part of the framework 6, such as the upper ring beam 5, to come into contact with the tower 3. However, the pivoting connection between the arms 7 and the pads 9 ensure that purely or primarily axial loads are transmitted to the pads 9.

This also has the effect of triangulating the framework 6 relative to the tower 3, as best shown in FIG. 5, facilitating generation of the axial loads F1, F2 in the pads 9 and thus the reactionary axial loads in the tower 3.

Figure 6:
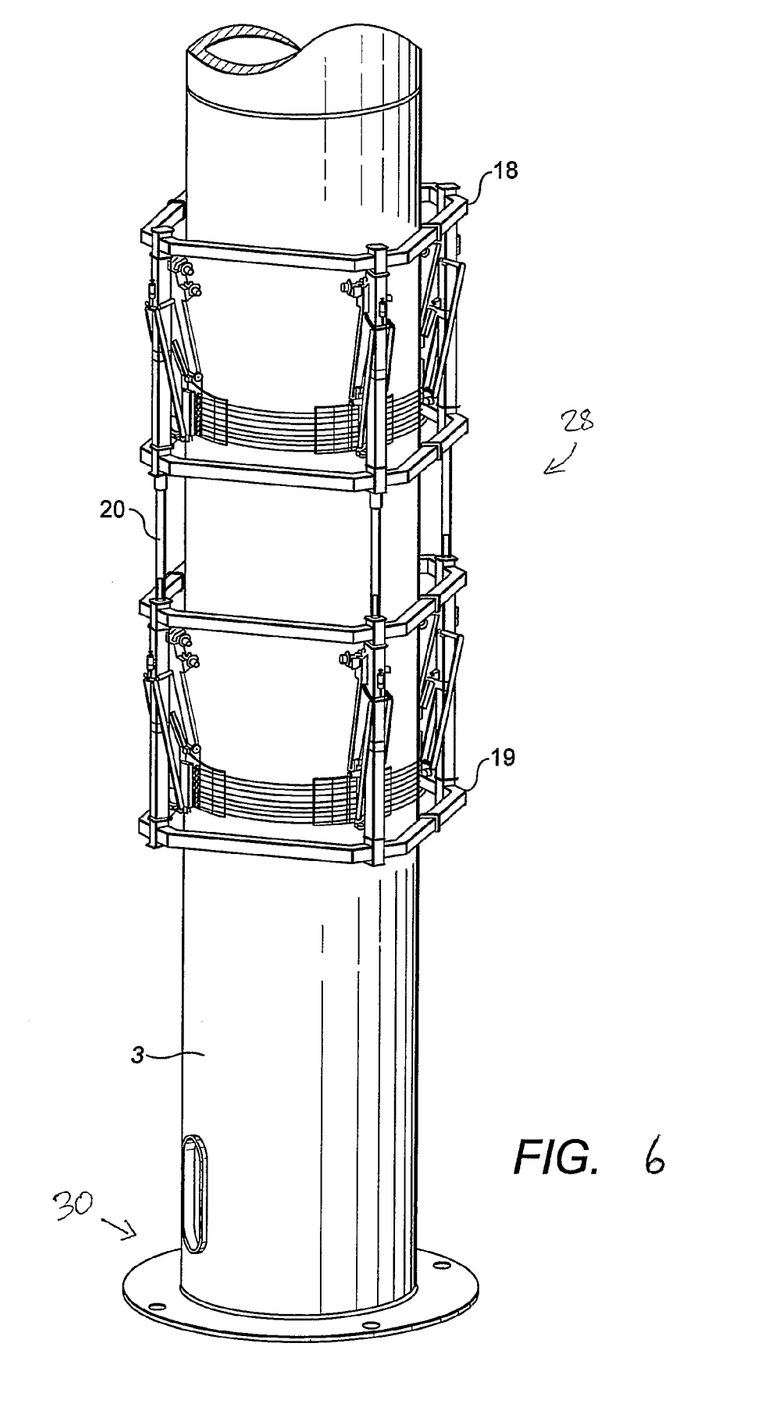
FIG. 6 is a view of an assembly comprising two of the clamps of FIG. 1 coupled together, the assembly shown during advancement along the length of a tubular in the form of a wind-turbine tower.

Referring now to FIG. 6, an assembly in the form of a self-advancing climbing device 28 is shown coupled to the tower 3, illustrated during advancement of the climbing device 28 along the length of the tower 3. The device 28 comprises two clamps 18 and 19, of similar construction and method of operation as the clamp 1 of FIGS. 1 to 5. The clamps 18, 19 are coupled together by an adjustable coupling 20 comprising a number of linear actuators, which facilitate adjustment of a distance between the two clamps 18, 19, for advancing the device along the tower 3. The actuators 20 may be hydraulic rams, telescoping box members actuated by rack and pinion drives, screw thread and nut, winches and wires or any suitable means.

In more detail, the device 28 is located around the tower 3, typically near a base 30 of the tower. The device 28 is actuated to advance along the length of the tower 3 and thus climb the tower as follows. Firstly, the upper clamp 18 is actuated and thus coupled to the tower 3 in the fashion described above. The actuators 20 are initially in a retracted configuration or state, such that the distance between the clamps 18, 19 is relatively short. The lower clamp 19 is then coupled to the tower 3 in the same way, the upper clamp 18 released from the tower 3, and the actuators 20 extended to increase the spacing between the clamps 18 and 19, thereby advancing the upper clamp 18 a distance along the length of the tower 3.

The upper clamp 18 is then reconnected to the tower 3, the lower clamp 19 released, and the actuators 20 retracted to decrease the spacing between the clamps 18, 19. This has the effect of advancing the lower clamp 19 a corresponding distance along the length of the tower 3. The lower clamp 19 is then reconnected to the tower 3, and the device 28 has thus advanced a determined distance up the tower.

This process is repeated until the device 28 reaches a desired operating height, at a determined location along the length of the tower 3. The clamps 18, 19 are then both clamped to the tower and locked, and an increased, operating clamp load is applied to the tower through each of the clamps 18, 19. This operating clamp load is higher than that applied whilst the device 28 ascends of the tower 3. The increased clamp load is generated by applying greater tensile loads to the tendons 16 using the winches 15. The reason for this is that, whilst the device 28 is ascending the tower 3, the device only need exert a sufficient clamp load to securely couple the device 28 to the tower, to bear the weight of the device. However, when it is desired to support an external load from the device 28, a larger clamp force is required, to ensure that a sufficiently large frictional force exists between the pads 9 and the tower 3 surface to maintain positioning of the device 28. The clamp load is determined depending upon the weight of the clamp 1/device 28 and the load to be supported, and will typically to be set at 5× the likely total weight borne, assuming a friction of coefficient between the pads 9 and the surface of the tower 3 of around 0.2. The device 28 can thus be used during construction of the tower, to carry additional tower sections or other turbine components, as well as in a maintenance procedure. To facilitate this, a suitable platform, crane and the like is mounted on the support structures of one or both of the clamps 18, 19.

Generally speaking, the apparatus herein described allows friction surfaces or pads to be clamped to a thin walled tubular structure such as a wind turbine without deformation or damage to the structure. This is achieved by the application of controlled radial loading such that the effect upon the buckling behaviour of the tubular structure is the same as that of applying a substantially uniform radial load to the complete circumference of the tubular structure.

In FIGS. 1 to 5, one manner in which an axial load can be applied to the friction surfaces 9, whilst a substantially uniform radial clamp load can be applied over the circumference of the tubular structure, is described.

In an alternative embodiment a toroidal bladder is installed round the circumference of the tower with the friction pads inserted between the bladder and the outer surface of the tower. Radial force is applied by pressurising a fluid such as air, within the bladder, so as to produce a uniform radial force over the circumference of the tower and the friction pads which may then be loaded axially.

The bladder may be arranged as a tube with closed ends that is taken from a fixed point, around the tower and back to the fixed point, where it is wound onto a reel so as to allow for the reduction in circumference of the tower as it tapers toward the top. Pressurisation of the bladder is from the fixed end while the reel is attached to the opposite end.

In a second alternative embodiment the bladder is made from a material with a high Poisson's Ratio (ratio of the strain in direction of the applied load to the strain normal to the load, or, ratio of transverse contraction strain to longitudinal extension strain in the direction of the stretching force) so that its expansion under pressure causes the circumference of the torus to reduce greatly, obviating the need for a take-up reel, and applies radial load to the friction pads which may then be loaded axially.

In a third alternative embodiment an array of lever systems powered by linear or rotary actuators is arranged on a circular beam or framework such that the levers apply radial force to friction pads which may then be loaded axially.

Where relatively heavy external loads are to be supported by the climbing device 28, the tension required in the tendons 16 to generate a sufficient clamp load may induce a greater deflection in the tower 3 than it is capable of safely supporting. In other words, the loads that can be applied may be limited by the ability of the tower 3 to resist global buckling under the combined action of radial loading from the clamps 9/tendons 16, and, potentially, compression or shear loads from the self weight of the climbing system or the loads suspended from it. The capacity of the tower 3 can be increased by the installation of stiffening rings within the tower positioned at locations at which the clamps will apply radial pressure. These may be constructed from relatively light tee bar rolled so that, in combination with the adjacent shell of the tower, an equivalent beam is formed. The tee bar may be retained in place by welding or preferably by bonding with adhesive compound. These will form part of the manufacturing process of the tower 3. At the larger diameters vertical slats will be arranged equally spaced around the portion of the tower 3 that is not covered by the pads 9. These will ensure that the radial load imparted by the tendons 16 is transmitted to the internal ring stiffeners and from there to the shell of the tower.

These tools may then be used onshore or offshore for the maintenance of wind turbines.

The clamp 1 and self-climbing device 28 of the present invention has the inherent advantage that it is able to grip towers of varying diameters and varying taper angles from parallel to 5 degrees of taper or more. In particular the self-climbing device can be adapted to accommodate variations in circumference and taper along the length of the tubular structure. In the embodiment shown in the Figures, the winches 15 can be used to tension the tendons 16 which are passed around the tubular structure, such that the length of the tendons can be altered so that they maintain a suitable radial force on the tubular structure even when the diameter or circumference of the structure changes. In the embodiment where a bladder is used, a reel may be provided which allows the circumference of the bladder to be increased or reduced in alignment with the circumference of the tower. The bladder may alternatively be manufactured from a material with a high Poisson's Ratio thereby eliminating the need for a reel.

The apparatus is also able to grip a very thin tower without inducing buckling as the tendons apply a substantially uniform load over the entire circumference of the tubular structure. The method and apparatus herein described enable the maximum possible axial load to be applied to the fixed clamp without buckling the tubular structure due to the combined axial and radial loads. It is therefore particularly suited to wind turbine towers.

Further modifications and improvements may be incorporated without departing from the spirit and scope of the invention herein intended.

The invention claimed is:

1. A clamp for clamping a support structure on a tubular structure comprising:
   a plurality of clamp members extending in a ring around a circumference of the tubular structure, each clamp member having a radially outer part;
   a plurality of flexible elongate elements attached to the radially outer part of each of the plurality of clamp members and extending in a circle around the ring;
   at least one pair of tensioning means, each of the pair of tensioning means attached to an end of each one of the plurality of flexible elongate elements;
   wherein the plurality of flexible elongate elements urge, when tensioned by the tensioning means, the plurality of clamp members to grip the tubular structure and exert a substantially uniform radial clamp load on the tubular structure; and
   wherein the tensioning means is remote from said circle, the clamp further comprising a respective pair of guide means for constraining each of the plurality of elongate elements in the said circle, each pair of guide means being positioned at least two points in said circle, each of the elongate elements being continuous and comprising three portions, wherein
      a first portion of each elongate element extends from a first component of the pair of tensioning means to and around a first component of the respective pair of guide means,
      a second portion of each elongate element encircles the ring of clamp members, and a third portion of each elongate element extends around and from a second component of the respective pair of guide means to a second component of the pair of tensioning means.

2. The clamp according to claim 1, wherein the tensioning means is adjustable to provide a variable tension in the plurality of elongate elements.

3. The clamp according to claim 1, wherein adjacent elongate elements are tensioned to generate a tensile load in oppose circumferential directions around the tubular.

4. The clamp according to claim 1, wherein each pair of guide means are positioned in the circle wherein the two ends of the second portion of the respective elongate element overlap to form a cross-over point.

5. The clamp according to claim 1, wherein the tensioning means comprises a winch.

6. The clamp according to claim 1, wherein each guide means comprises a pulley, the plane of which is aligned substantially tangential to the circumference of the elongate element.

7. A clamp for clamping a support structure on a tubular structure comprising:
    a plurality of clamp members extending in a ring around a circumference of the tubular structure, each clamp member having a radially outer part;
    a plurality of flexible elongate elements attached to the radially outer part of each of the plurality of clamp members and extending in a circle around the ring;
    at least one pair of tensioning means, each of the pair of tensioning means attached to an end of each one of the plurality of flexible elongate elements;
    wherein the plurality of flexible elongate elements urge, when tensioned by the tensioning means, the plurality of clamp members to grip the tubular structure and exert a substantially uniform radial clamp load on the tubular structure,
    the clamp further comprising:
    at least one first support member attached to said clamp member and extending in a radial plane of the tubular structure, wherein the support member is capable of positioning the clamp member at a desired radial location relative to a surface of the tubular structure, and further comprising at least one second support member associated with the clamp member capable of adjusting an angle of the clamp member relative to the tubular and to align the clamp member to the surface of the tubular structure.

8. The clamp of claim 7, further comprising a frame coupled to the first and/or second support members, encircling the tubular structure, the frame comprising a plurality of vertical columns, an upper ring beam, and a lower ring beam.

9. The clamp of claim 8, further comprising a first hydraulic cylinder capable of moving the first support member, the hydraulic cylinder being coupled between the vertical columns and the first support member.

10. The clamp of claim 9, further comprising a second hydraulic cylinder capable of changing the angle between the vertical columns and the clamp members, and further comprising locking means.

11. The clamp of claim 10, wherein the clamp is a self-advancing climbing device mountable on a tubular column, wherein the upper and lower rings of clamp members are coupled together by a coupling which facilitates adjustment of a distance between the clamp members, to facilitate advancement of the device along a length of the column.

12. A method of clamping a support structure on a tubular structure, the method comprising securing the clamp of claim 1 around the tubular structure.

13. An arrangement for supporting a support structure on a tubular structure, the arrangement comprising:
    a plurality of clamp members adapted to grip the tubular structure and positioned circumferentially around the tubular structure;
    a plurality of flexible elongate elements extending around the circumference of the tubular structure and adapted to exert a force on the clamp members urging them to grip the tubular structure;
    the clamp members and the plurality of flexible elements being adapted to exert a substantially uniform radial clamp load on the tubular structure; and
    wherein the support structure is pivotally connected to the clamp members and, when loaded at a point off an axis of the tubular structure, induces, via the pivotal connections, a reaction load in the tubular structure substantially parallel to the axis,
    the arrangement further comprising at least one second support member pivotally coupled to each clamp member operable to adjust an angle of the clamp member relative to the tubular and to align the clamp member to the surface of the tubular structure.

14. The arrangement according to claim 13, wherein the radial clamp load on the tubular structure is independent of external loads applied to the support structure.

15. The arrangement according to claim 14, further comprising at least one first support member pivotally coupled with each clamp member, the first support member capable of exerting a positioning force on the clamp member, the positioning force preventing a turning moment being transmitted between the support structure and the clamp member.

16. The arrangement of claim 13, further comprising a frame coupled to the first and/or second support members, encircling the tubular structure, the frame comprising a plurality of vertical columns, an upper ring beam, and a lower ring beam, further comprising a first hydraulic cylinder capable of moving the first support member, the hydraulic cylinder being coupled between the vertical columns and the first support member, and a second hydraulic cylinder capable of changing the angle between the vertical columns and the clamp members, and further comprising locking means.

17. The arrangement of claim 16, wherein the arrangement is a self-advancing climbing device mountable on a tubular column, wherein the upper and lower rings of clamp members are coupled together by a coupling which facilitates adjustment of a distance between the clamp members, to facilitate advancement of the device along a length of the column.

* * * * *